United States Patent [19]
Mathews

[11] 3,785,472
[45] Jan. 15, 1974

[54] SLAT ELEVATORS FOR COMBINES OR THE LIKE

[76] Inventor: Bernard C. Mathews, P.O. Box 70, Crystal Lake, Ill. 60014

[22] Filed: Feb. 17, 1972

[21] Appl. No.: 227,202

[52] U.S. Cl. .............................................. 198/171
[51] Int. Cl. ............................................ B65g 19/00
[58] Field of Search.................... 198/171, 174, 175, 198/176, 172, 168

[56] References Cited
UNITED STATES PATENTS

| 2,263,458 | 11/1941 | Gellatly | 198/168 |
| 2,403,024 | 7/1946 | Rixon | 198/171 |
| 2,631,716 | 3/1953 | Knottmann | 198/168 |

FOREIGN PATENTS OR APPLICATIONS

| 401,822 | 5/1966 | Switzerland | 198/174 |

Primary Examiner—Evon C. Blunk
Assistant Examiner—Douglas D. Watts
Attorney—Zabel et al.

[57] ABSTRACT

The slat elevator includes a diagonally disposed conduit open at its upper and lower ends, and having a bottom transverse wall. An upper drum carries several sprockets which drive several chains which also pass around a lower drum. Each chain carries a separate series of flexible slats made of tire carcass, and mounted with their width parallel to the path of the chain so that the slat ends curve down toward the bottom wall and are flexed away from same by the crop to avoid packing between the slat ends and the bottom wall. Each slat trails its attachment link. A plow located beneath each sprocket removes any crop which rides on the top of the chain to avoid clogging the sprocket. Dividers on the upper span maintain the spacing between the separate slat series.

9 Claims, 8 Drawing Figures

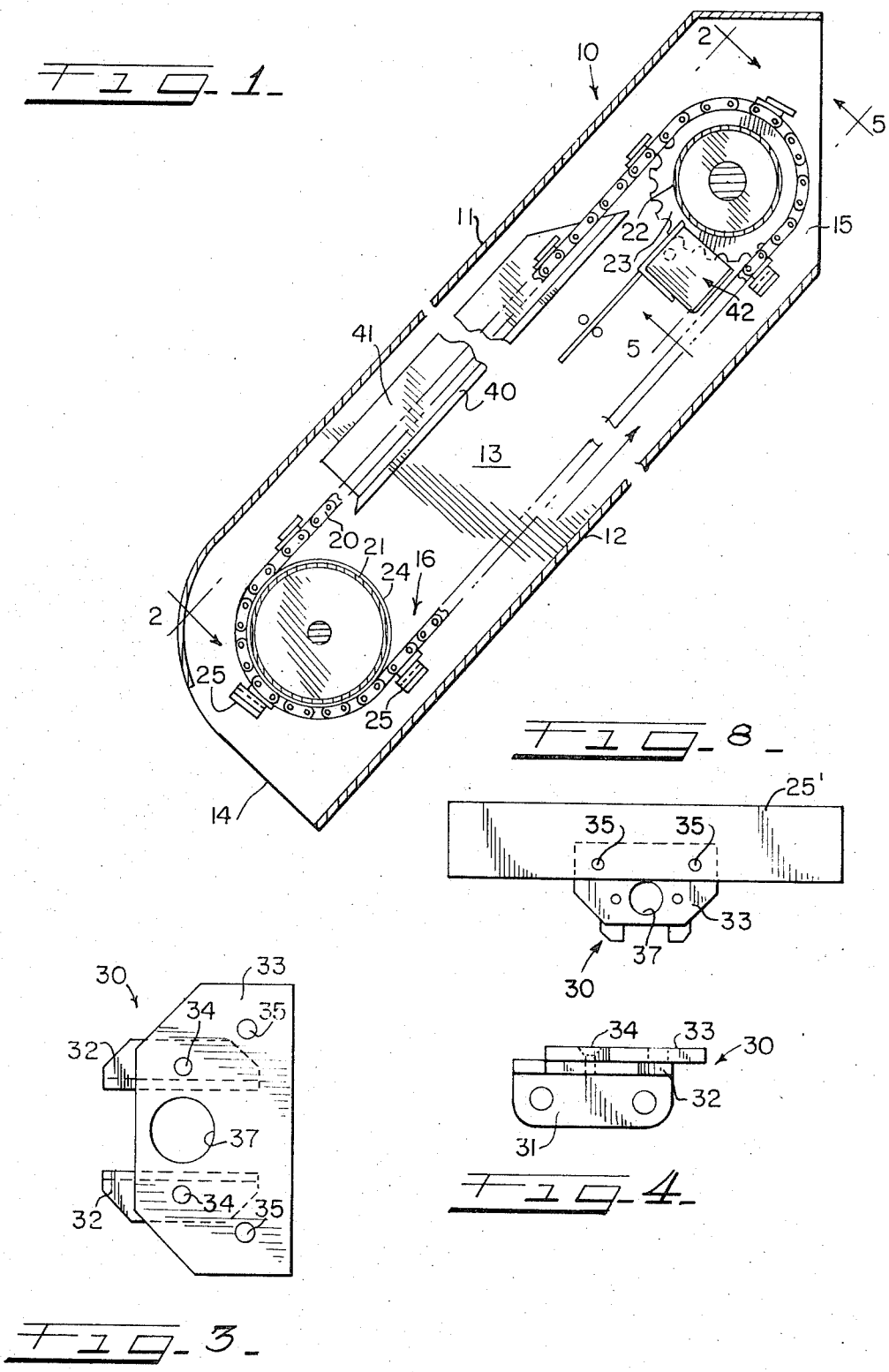

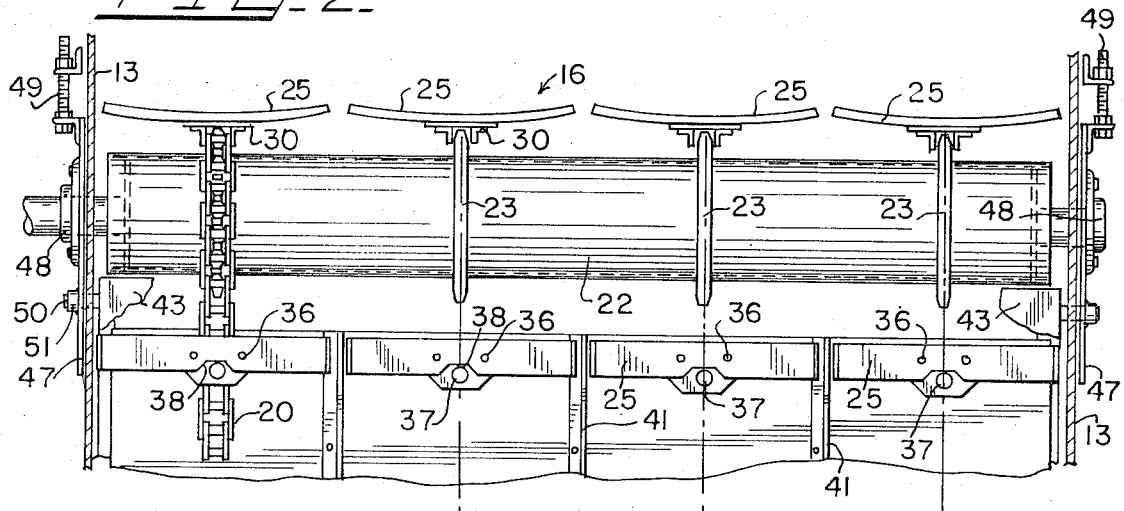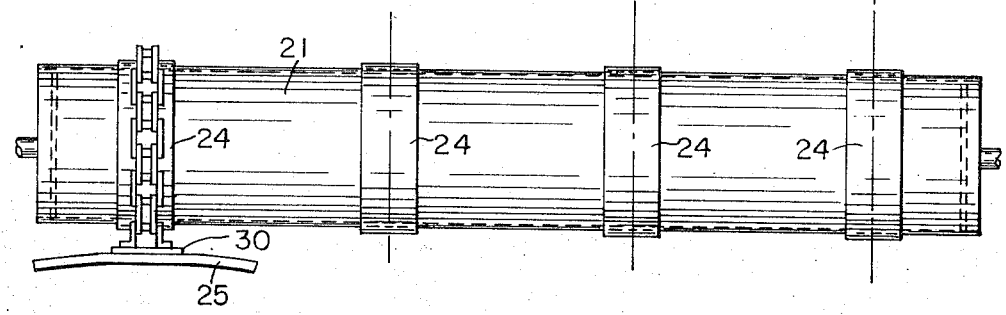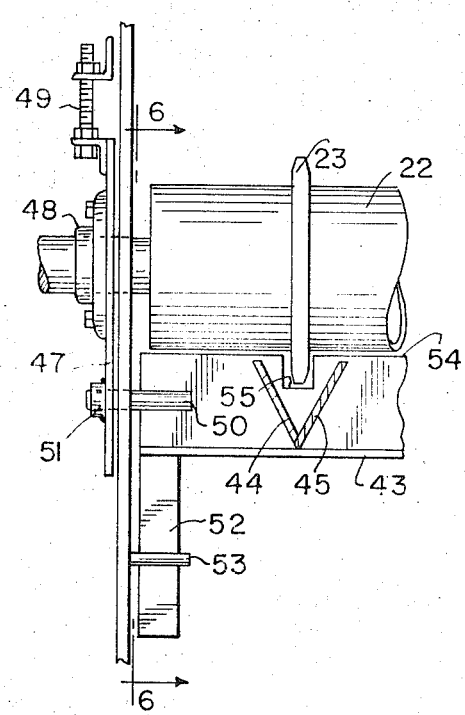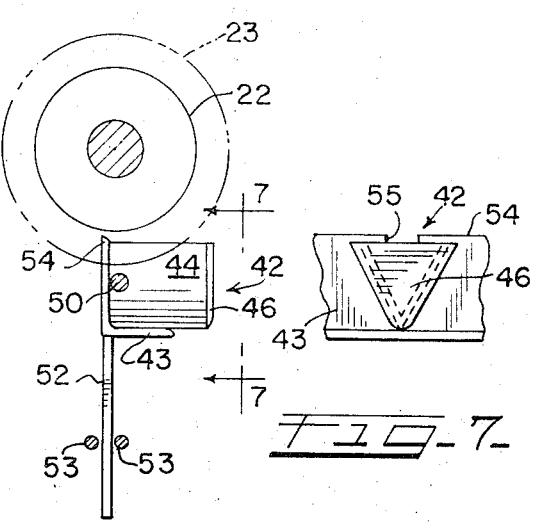

SLAT ELEVATORS FOR COMBINES OR THE LIKE

This invention relates to a slat elevator for combines and to an improved slat therefor. Slat elevators are used primarily in the header for feeding the cut crop up to the threshing cylinder, although they may be used in other parts of the combine.

The present invention is of particular utility in a combine in which the crop handling mechanism is located above the grain bins, as described in my copending application, Ser. No. 186,053, filed Oct. 4, 1971, to which reference is hereby made. In such an arrangement, the feeder may be as long as 7 feet, and this introduces problems not encountered in the conventional slat conveyors provided in headers which may be of the order of 3 feet in length. However, my invention is also of utility in the shorter feeders.

The usual slat elevator has two or more chains passing over sprockets, pulleys, or drums and which carry a series of slats. These are located in a conduit. The slats are connected to chains by brackets so that each slat is supported by two chains. The bracket is rigidly secured to a link of the chain.

Sometimes a corn cob will pass between the chain and the sprocket causing the chain to ride up off of the sprocket and jump a tooth. Thus the slat is slightly skewed, stressing the bracket or other parts of the mechanism. In the usual construction, if two teeth are skipped, then the chain is stressed to such an extent that it may break at the link portion of the bracket or jump the sprocket entirely.

According to my invention, I provide a plurality of chains. Each chain carries a series of slats which are separate from the slats of adjacent chains. Thus, if any particular chain should skip a sprocket tooth, the operation of the other chains will not be affected. The slats of the skipped tooth chain will continue to perform their elevating function irrespective of whether they are aligned with the slats of other chains.

Jumping a chain completely off a sprocket or breaking a chain will not involve any other chain in the failure. Also there is no danger of feeding heavy long cross slats into the threshing cylinder.

My invention also provides an improved slat which is oriented so that it is very flexible in a direction perpendicular to the plane in which the chains operate, and, except at the center mount of the chain, somewhat flexible in the plane in which the chains operate. In the feeding of corn, for example, a rapidly moving slat will engage an ear of corn with considerable force, and, in delivery, drive it toward the cylinder. The cylinder traveling at a mile a minute circumferential speed may accept the ear or may drive it back toward the slat. Hit at the outer end, the slat will give without damage and without transmitting twisting stress to the chain. Hit at the center, the block will be minimized by the low slat configuration, and what shock the slat does receive will be in line with and not damaging to the chain.

The flat flexible slats give, rather than causing the material entering under the chain to bounce back. Also the flexible slats comb the material in, pressing it down toward the feeder bottom wall and dragging it up the conduit at the same time. This feed action is improved by mounting the slat on the trailing side of the attachment link of the chain so that the slat swings out as it passes around the lower or feed drum and then returns rapidly to its flat position as the chain straightens out after leaving the lower or feed drum. This action is most effective at the upper or delivery end where the slat cams out as the attachment link swings up around the top drum or drive sprocket. The acceleration caused by this swinging out of the slat helps to throw the material across any gap or rock trap between the elevator and the cylinder so as to increase the positive character of the feeding action into the cylinder.

This flexible slat arrangement also satisfactorily feeds grain, and the parallel orientation greatly improves the pick up of straw at the entrance, and particularly in the case of the header slat elevator where the entrance is behind and slightly under the transverse auger.

My invention also provides an improved "plow" arrangement which cleans the inside of the chain just before it engages the sprocket, in order to prevent the movement of ears into the space between the sprocket and the chain.

Other objects, features, and advantages will become apparent as the description proceeds.

In the drawings:

FIG. 1 is a side elevation of a slat elevator embodying my invention, the section being taken through the conduit or casing in which the elevator is located, and showing the angular inclination;

FIG. 2 is a plan view along line 2—2 of FIG. 1;

FIG. 3 is a plan view of the mounting means for one of the slats;

FIG. 4 is a side elevation of FIG. 3;

FIG. 5 is a fragmentary section taken through line 5—5 of FIG. 1 showing the stripper and the plows, the chains, flanges, and certain other elements being removed for the sake of clarity;

FIG. 6 is section taken along line 6—6 of FIG. 5;

FIG. 7 is a front view of the plow of FIGS. 5 and 6, along line 7—7 of FIG. 6, showing the end plate in elevation; and FIg. 8 is a plan view of a modified slat assembly.

FIG. 1 shows a conduit 10 in which the slat elevator 16 is disposed. The shape and type of the conduit depends on the location and environment of the conveyor device; the conduit 10 is shown only by way of example. It includes upper and lower transverse walls 11 and 12, and side walls 13. It has an open lower end 14 for receiving the crop material to be conveyed, and an open upper end 15 for delivery of the crop. For example, a conveyor could extend between a header and the threshing cylinder of a combine where the threshing cylinder is located at the upper front end of the casing, as shown in my copending application Ser. No. 186,053, filed Oct. 4, 1971.

The slat elevator 16, as shown in FIGS. 1 and 2, comprises a plurality of roller chains 20 extending between a lower drum 21 and an upper drum or tubular sprocket shaft 22 suitably journalled in the side walls 13 of the feeder conduit 10. The upper drum 22 has a sprocket 23 for each of the chains. The lower drum 21 has a wear plate 24 for each chain in the form of a tubular piece secured to the drum, on which the chain bears as it passes around the drum.

Each chain carries a series of parallel oriented flexible slats 25, preferably made of tire carcass which has a natural curvature, and mounted with the curvature of the slat such that the ends of the slat or flight extend downwardly toward the bottom wall 12 at the lower span of the chain.

This relationship of the slat curvature to the chain, which can be termed "outwardly concave" increases the effective "reach" of the flight without increasing the frontal area. In the case of very pliable stock, the weight of the ends of the slat may cause it to scrape the bottom wall 12, at the lower span, and it flattens out at the upper span.

The means for mounting a slat 25 on a chain 20 is shown in FIGS. 3 and 4. At suitable intervals, such as at every sixth link, is an attachment link 30. An attachment link is a pin link in which each of the outside plates 31 has an outwardly directed flange 32. A plate 33 is secured to the flanges 31 by suitable rivets 34. The plate 33 has bolt or rivet holes 35 therein. Then the slat 25 is secured to the plate 33 by bolts or rivets 36.

The plate 33 also has a hole 37 in it which overlies the center of the link 30. If any material, such as a piece of cob, should be forced by a sprocket tooth into the attachment link 30, the hole 37 and an overlying notched portion 38 in the slat 25 prevent a jamming which might otherwise cause the chain to jump a tooth.

As is usual in slat elevators for handling cut crop, the elevator extends diagonally upwardly and rearwardly, and the upwardly moving span is the lower span. The crop is engaged by the slats 25 and slides on the lower transverse wall 12 of the conduit 10. Where the lower wall terminates, the crop is ejected with considerable momentum through the open upper end 15.

The plate 33 and the slat 25 are oriented in a plane parallel to the lower wall 12 of the conduit making the slat considerably more flexible in a direction away from the wall 12 than in the direction of motion. As a result, where there is an accumulation of crop on the wall 12 which is thicker than the spacing between the slat 25 and the wall 12, the slat will flex with its outer ends riding up over the crop, rather than causing the crop to pack between a rigid slat and the wall 12.

Any substantial resistance to the slat movement is limited to the area immediately beneath the attachment link 30 with the result that twisting and bending forces on the chain are greatly reduced.

The slat 25 is preferably offset in the trailing direction from the attaching link so that the transverse median line of the slat is located rearwardly of the transverse midpoint of the attachment link 31, which, in the example shown, is beneath the center of the hole 37. Thus, when the slat passes around the upper drum 22, a point on the slat 25 which is immediately above the transverse midpoint of the link will have the same spacing as when the slat passes along the lower span, but the rear trailing edge of the slat will swing outwardly away from the chain, providing a greater radius between the trailing edge and the axis of the drum 22 as shown in FIG. 1. Therefore the linear speed of the rear trailing edge will be somewhat greater than the speed of the center point of the slat. This plus the resilience of the slat provides a certain kicking action which is of utility in throwing the crop material outwardly through the opening 15.

This action may be accentuated by a comparison of the notched slat 25 shown in FIG. 2, with the slat 25' of FIG. 8, by increasing the offset in the trailing direction. For example, the slat 25' may be mounted on the plate 33 so that its leading edge is definitely offset from the midpoint of the link 32, as represented by the center of the hole 37, the offset of the trailing edge being correspondingly increased in the trailing direction.

Preferably, the leading edge clears the opening 37 so as to avoid notching, as shown in FIG. 8.

Where the elevator is 6 or 7 feet long, a backing plate 40 is located beneath the upper or slack span. Means are provided to maintain the chain spacing as it moves around the lower drum 21, such means preferably being in the form of dividers 41 mounted on the upper surface of the backing plate 40. Thus, as the slack span moves onto the wear plate 24 of the lower drum 21, it will be in the proper aligned position matching the spacing of the sprockets 23 on the upper drum 22. The lower span is tensioned by the weight of the crop as it is dragged up the wall 12.

On relatively short spans, such as are encountered in the header in which the distance from the platform up to the header mount is only about 3 feet, the dividers 41 are not necessary.

Conventional means, not shown, are provided for driving the upper drum 22. The lower drum is an idler, driven by its contact with the chains.

As shown in FIGS. 5 and 6, means are provided to prevent material, such as an ear of corn, or a piece of corn stalk, from passing between a chain 20 and its sprocket 23, which might cause the chain to jump a tooth. Such means are in the form of a triangular element 42 referred to herein as a "plow" located beneath the upper drum and adjacent the upwardly moving span of the chain.

The plows 42 are mounted on an angle iron 43 located along the center line of a slat elevator adjacent the surface of the upper drum 22. The plow 42 comprises a pair of plates 44 and 45 arranged in a V with the apex of the V being presented toward any material being carried upwardly on the inside of the chain 20. The outer ends of plates 44 and 45 are closed by a triangular plate 46 which has its surface closely adjacent the chain 20.

The angle iron 43 may be rigidly secured to the side walls 13 of the conduit 10.

However, in the case of a long feeder where the upper drum 22 is adjustably mounted in tightener plates 47 which carry the drum bearings 48, then the angle iron 43 is also mounted in the tightener plates 47 so that the relationship of the angle iron 43 and plows 42 to the upper drum 22 will remain the same irrespective of chain tightening adjustments.

As shown in FIGS. 2 and 5, the tightener plates 47 are each supported at their upper rear ends by a screw adjustment device 49 and are each guided at their lower ends by a pin 50 passing through a collar 51 on plates 47 and a slot in the side plates 13. The inner end of each pin is welded to the angle iron 43 so that the latter can be supported from the tightener plates 47.

A strip 52 extends downwardly from the angle iron 43 and between two locating pins 53 in the side walls 13 which maintain the angle iron 43 and plows 42 in the proper angular position, but still permit movement of the assembly 47, 22, 43, 42, with respect to the side walls 13.

The edge 54 of angle iron 43 can be located close to the periphery of the upper drum 22 to serve as a stripper to srip any leaves or stems that may adhere to the drum surface, thus avoiding wrap around. The edge 54 is notched at 55 to accommodate the sprocket 23.

In operation, any material which may be riding on the wrong side of the chain is displaced to one side or the other by the plow plates 44 and 45 so that it drops down on the lower wall 12 to be picked up by the slats 25.

At the same time, the side plates of the chain links may ride on the triangular face plate 46 in those cases where the mass of crop material being dragged up the wall 12 causes the mid-part of the lower span to bow upwardly away from the bottom wall. Thus the face plate 46 forces the chain down toward the normal chain path, the spacing between the surface of face plate 46 and normal path of the inner edges of the links being from three-sixteenths to one-quarter inch.

Although only preferred embodiments of my invention have been shown and illustrated herein, it will be understood that various modifications and changes can be made in the constructions shown without departing from the spirit of my invention, as pointed out in the appended claims.

I claim:

1. A slat elevator for a combine or the like comprising a conduit having transverse walls and side walls, an upper drum and a lower drum mounted for rotation about parallel transverse axes at the opposite ends of said conduit, said upper drum including a plurality of sprockets mounted thereon in axially spaced relationship, a plurality of chains extending around and between said drums, each chain engaging one of the sprockets of the upper drum and being driven thereby, a series of slats carried by each of said chains, the slats of each series being supported by a single chain, a cross member extending between said side walls at a point adjacent said upper drum, said conduit extending diagonally upward with the downwardly moving span above the upwardly moving span, one of said transverse walls being located beneath said upwardly moving span, a plurality of plow members mounted on said cross member, one beneath each of said sprockets and having a face plate located adjacent said upwardly moving span for removing material from the upper surface of said chain, tightener plates mounted externally of said side walls at the upper end of said conduit, said upper drum being journalled in said tightener plates, and mounting means on said tightener plates extending inwardly from said tightener plates and through said side walls, said cross member being mounted on said mounting means.

2. A slat elevator for a combine or the like comprising a conduit having transverse walls and side walls, an upper drum and a lower drum mounted for rotation about parallel transverse axes at the opposite ends of said conduit, said upper drum including a sprocket mounted thereon, a chain extending around and between said drums and engaging said sprocket and being driven thereby, a series of transverse slats carried by said chain, said slats each comprising a strip of nonmetallic resilient material having a substantially rectangular cross section with the longer cross sectional dimension of said slat being oriented parallel to the path of said chain, said chain including an attachment link having outwardly extending flanges, and a plate secured to said flanges with its plane being parallel to the path of said chain, one of said slats being secured to said plate, said plate having an opening therein located at the midpoint of said attachment link so as to be above a tooth of said sprocket, and said slat having a cut-away portion located above said opening so that material entrapped between a sprocket tooth and said attachment link may be forced through said opening.

3. A slat elevator for a combine or the like comprising a conduit having transverse walls and side walls, an upper drum and a lower drum mounted for rotation about parallel transverse axes at the opposite ends of said conduit, said upper drum including a sprocket mounted thereon, a chain extending around and between said drums and engaging said sprocket and being driven thereby, a series of transverse slats carried by said chain, said slats each comprising a strip of nonmetallic resilient material having a substantially rectangular cross section with the longer cross sectional dimension of said slat being oriented parallel to the path of said chain, said chain including an attachment link having outwardly extending flanges, and a plate secured to said flanges with its plane being parallel to the path of said chain, one of said slats being secured to said plate, said plate having an opening therein located at the midpoint of said attachment link so as to be above a tooth of said sprocket, and said slat having its leading edge offset in the trailing direction from said opening so that material entrapped between a sprocket tooth and said attachment link may be forced through said opening.

4. A slat elevator for feeding cut crop to the threshing cylinder of a combine or the like comprising a conduit having transverse walls and side walls, an upper drum and a lower drum mounted for rotation about parallel transverse axes at the opposite ends of said conduit, said upper drum including a plurality of sprockets mounted thereon in axially spaced relationship, a plurality of chains extending around and between said drums, each chain engaging one of the sprockets of the upper drum and being driven thereby, and a series of slats carried by each of said chains, the slats of each series being supported by a single chain, said lower drum providing a circumferentially smooth cylindrical surface portion for cooperation with each of said chains so as to permit longitudinal displacement of one chain and its series of slats with respect to other chains and their series of slats, when a tooth is skipped at the sprocket associated with the upper end of said one chain, slat mounting means connecting the mid-point of each slat to its associated chain, the ends of each slat being unconfined for flexing movement, said slats each comprising a strip of nonmetallic resilient material having a substantially rectangular cross section with the width dimension being substantially greater than the thickness dimension and being oriented with the width dimension substantially parallel to the path of the chain on which said slat is mounted so that the ends of each slat may flex in a direction toward and away from said transverse walls, said slat ends being less flexible in the direction parallel to said chain path.

5. A slat elevator as claimed in claim 4 in which said conduit extends diagonally upward with the downward moving span above the upwardly moving span, a backing plate for said downwardly moving span, a plurality of dividers extending upwardly from said backing plate, the ends of the slats of each series normally being in a non-interfering relationship with the slats of an adjacent series, one divider being located between each two adjacent slat series and being of a dimension such that each divider overlaps at least a portion of the ends of the slats of said two adjacent slat series, said dividers cooperating with said slats to maintain between said chains as they pass over said lower drum a transverse spacing substantially equal to said sprocket spacing.

6. A slat elevator as claimed in claim 4 in which said lower drum is provided with tubular wear plates engaged by said chains.

7. A slat elevator as claimed in claim 4 which includes a cross member extending between said side walls at a point adjacent said upper drum, said conduit extending diagonally upward with the downwardly moving span above the upwardly moving span, one of said transverse walls being located beneath said upwardly moving span, and a plurality of V-shaped plow members mounted on said cross member, one beneath each of said sprockets for removing material from the upper surface of said chain and having a face plate located adjacent said upwardly moving span providing a bearing surface for said chain.

8. A slat elevator as claimed in claim 4 in which said slat has a natural curvature and is mounted on said chain with the curvature outwardly concave.

9. A slat elevator as claimed in claim 8 in which said nonmetallic resilient material is tire carcass.

* * * * *